(12) United States Patent
Martin et al.

(10) Patent No.: US 11,369,953 B2
(45) Date of Patent: Jun. 28, 2022

(54) RESIN BEADS AND INORGANIC PARTICLES

(71) Applicant: DDP SPECIALTY ELECTRONIC MATERIALS US 8, LLC, Collegeville, PA (US)

(72) Inventors: Collin H. Martin, North Wales, PA (US); John David Finch, North Wales, PA (US); Takashi Masudo, Natori (JP); Daika Kouzaki, Iwanuma (JP)

(73) Assignee: DDP SPECIALTY ELECTRONIC MATERIALS US 8, LLC

( * ) Notice: Subject to any disclaimer, the term of this patent is extended or adjusted under 35 U.S.C. 154(b) by 259 days.

(21) Appl. No.: 16/762,566

(22) PCT Filed: Nov. 30, 2017

(86) PCT No.: PCT/US2017/063818
§ 371 (c)(1),
(2) Date: May 8, 2020

(87) PCT Pub. No.: WO2019/108186
PCT Pub. Date: Jun. 6, 2019

(65) Prior Publication Data
US 2020/0330974 A1 Oct. 22, 2020

(51) Int. Cl.
| | | |
|---|---|---|
| *B01J 39/05* | (2017.01) | |
| *B01J 47/016* | (2017.01) | |
| *B01D 15/36* | (2006.01) | |
| *B01J 39/20* | (2006.01) | |
| *C02F 1/42* | (2006.01) | |

(52) U.S. Cl.
CPC ............ *B01J 39/05* (2017.01); *B01D 15/362* (2013.01); *B01J 39/20* (2013.01); *B01J 47/016* (2017.01); *C02F 1/42* (2013.01); *C02F 2001/425* (2013.01)

(58) Field of Classification Search
None
See application file for complete search history.

(56) References Cited

U.S. PATENT DOCUMENTS

| | | |
|---|---|---|
| 5,176,832 A | 6/1993 | Dorta et al. |
| 2018/0001313 A1* | 1/2018 | Gisch .................. B01D 15/362 |

FOREIGN PATENT DOCUMENTS

| | | |
|---|---|---|
| WO | 2016144568 | 9/2016 |

OTHER PUBLICATIONS

DeMarco, M. et al., in "Arsenic removal using a polymeric/inorganic hybrid sorbent," Water Research, vol. 37, pp. 164-176, 2003.

PCT International Search Report, dated Jun. 27, 2018, for International Application No. PCT/US2017/063818, filed Nov. 30, 2017; ISA/EPO, Nicoleta Kaluza Authorized Officer.

* cited by examiner

*Primary Examiner* — Chester T Barry
(74) *Attorney, Agent, or Firm* — Carl P. Hemenway; Kenneth Crimaldi

(57) ABSTRACT

Provided is a resin composition comprising
(a) a collection of resin beads, wherein the collection of resin beads has pH of 8 or above, and wherein the collection of resin beads has volume average diameter of 150 μm to 2,000 μm; and
(b) a collection of inorganic particles, wherein the inorganic particles contain one or more alkaline earths, and wherein the collection of inorganic particles has volume average diameter of 0.5 μm to 50 μm.

Also provided is a method of processing an aqueous composition using such a composition.

8 Claims, No Drawings

RESIN BEADS AND INORGANIC PARTICLES

A common use for resin beads is the processing of liquid aqueous compositions, for example for removing one or more dissolved ion or compound from the liquid aqueous composition, or for separating two or more dissolved ions or compounds that are dissolved in the liquid aqueous composition from each other. When performing such processes, the liquid aqueous composition is normally forced through a container under pressure, while the container contains resin beads that are trapped within the container. The pressure may be supplied by gravity or by a pump or by some other means. The presence of the resin beads in the container hinders the passage of the liquid aqueous composition, which causes the pressure of the liquid aqueous composition to be higher at the inlet of the container than at the outlet. It is undesirable for this difference in pressure (known herein as "delta-P") to be high. Therefore it is desired to provide a resin composition that contains resin beads and that operates at lower delta-P than previously known similar compositions.

In some processes, resin beads of relatively small diameter are desired. Smaller diameter resin beads normally have an increased delta-P, as predicted by the Ergun equation. Therefore it is particularly desired to provide a collection of resin beads of relatively small diameter that has reduced delta-P.

M. DeMarco et al., in "Arsenic removal using a polymeric/inorganic hybrid sorbent," *Water Research*, vol. 37, pp. 164-176, 2003, describes a polymeric/inorganic hybrid sorbent, which is a spherical macroporous cation exchanger bead within which are agglomerates of nanoscale hydrated Fe oxide. It is desired to provide a resin composition having inorganic particles that contain alkaline earth in addition to resin beads.

The following is a statement of the invention.

A first aspect of the present invention is a resin composition comprising
  (a) a collection of resin beads, wherein the collection of resin beads has pH of 8 or above, and wherein the collection of resin beads has volume average diameter of 150 µm to 2,000 µm; and
  (b) a collection of inorganic particles, wherein the inorganic particles contain one or more alkaline earths, and wherein the collection of inorganic particles has volume average diameter of 0.5 µm to 50 µm.

A second aspect of the present invention is a method of processing an aqueous composition, wherein the method comprises passing the aqueous composition through an inlet into a container that has an interior, and then passing the aqueous composition out of the container through an outlet, wherein the interior of the container comprises the resin composition of claim 1, wherein the composition of claim 1 is prevented from passing out of the container.

The following is a detailed description of the invention.

As used herein, the following terms have the designated definitions, unless the context clearly indicates otherwise.

A "polymer," as used herein, is a relatively large molecule made up of the reaction products of smaller chemical repeat units. As used herein, the term "resin" is a synonym for "polymer." Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Vinyl monomers have the structure

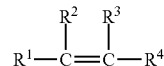

where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof. Vinyl monomers are capable of free radical polymerization to form polymers.

Styrenic monomers are vinyl monomers in which each of $R^1$, $R^2$, and $R^3$ is hydrogen and —$R^4$ has the structure

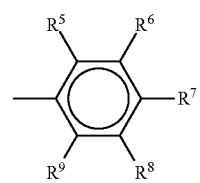

where each of $R^5$, $R^6$, $R^7$, $R^8$, and $R^9$ is, independently, a hydrogen, a halogen, an aliphatic group (such as, for example, an alkyl group or a vinyl group), a substituted aliphatic group, an aryl group, a substituted aryl group, another substituted or unsubstituted organic group, or any combination thereof.

Acrylic monomers are vinyl monomers in which each of $R^1$ and $R^2$ is hydrogen; $R^3$ is either hydrogen or methyl; and —$R^4$ has one of the following structures:

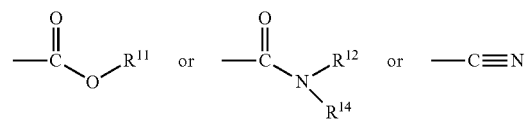

where each of $R^{11}$, $R^{12}$, and $R^{14}$ is, independently, hydrogen, a $C_1$ to $C_{14}$ alkyl group, or a substituted $C_1$ to $C_{14}$ alkyl group.

A reaction among monomers to form one or more polymers is referred to herein as a polymerization process. The residue of a monomer as part of a polymer after a polymerization process has taken place is known herein as a polymerized unit of that monomer.

Resin beads are individual particles, each containing 50% or more by weight of polymer. Beads are in the solid state at 23° C. Beads have volume-average diameter of 1 µm or greater. If a particle is not spherical, the diameter of the particle is taken herein to be the diameter of an imaginary sphere that has the same volume as the particle.

Resin beads may also be classified according to the porosity of the beads, which is measured using the Brunauer-Emmett-Teller (BET) method using nitrogen gas. Macroreticular ("MR") resin beads have number-average pore diameter of 50 nm to 500 nm. Gel resin beads have much smaller pores than MR resin beads. The number-average pore diameter of gel resin beads is often too small to measure properly with the BET method. The number-average pore diameter of gel resin beads is considered to be less than 20 nm.

A collection of resin beads has a characteristic pH, measured as follows. The collection of resin beads has 30 to 70% water by weight based on the total weight of the collection of resin beads. At ambient temperature (approximately 23° C.), 10 g of the collection of resin beads is mixed with 100 ml of deionized water, then agitated, then allowed to stand for 1 hour, and then inverted and shaken 3 times. The resin beads are allowed to settle to the bottom of the container, then the pH of the water portion is measured and reported as the pH of the resin.

As used herein, a chemical group is said herein to be "substituted" if a substituent (that is, an atom or chemical group) is attached. Suitable substituents include, for example, alkyl groups, alkynyl groups, aryl groups, halogen atoms, nitrogen-containing groups including amine groups, oxygen-containing groups including carboxyl groups, sulfur-containing groups including sulfonic acid groups, nitrile groups, and combinations thereof.

As used herein, an aqueous medium is a liquid that contains 50% or more water, by weight based on the weight of the aqueous medium. Substances dissolved into solution in the aqueous medium are considered herein to be part of the aqueous medium. Substances dispersed in the aqueous medium in the form of particles of diameter 10 nm or larger are not considered herein to be part of the aqueous medium.

As used herein, a chemical group attached to a polymer is considered acidic if that chemical group contains a labile hydrogen atom, and that chemical group has the characteristic that there exists a range of pH values that overlaps or includes the pH values from 7 to 11 such that, in that range of pH values, when the polymer is in contact with an aqueous medium, 50 mole % or more of the chemical groups have detached the labile hydrogen atom and are anionic. The polymer is said herein to have an acidic group as long as the acidic group is covalently bonded to the polymer, whether the labile hydrogen atom is attached to the acidic group or not.

Among polymers having attached acidic groups, the polymer is said to be in "H form" if 50 mole % or more of the acidic groups have the labile hydrogen attached. The polymer is said to be in "M form" where M is an atom other than hydrogen or a compound capable of forming a cation, if 50 mole % or more of the acidic groups attached to the polymer are in the form of an ionic complex $(AG^-)_n M^{+n}$, where $AG^-$ is an acid group attached to the polymer, having detached the labile hydrogen atom, and $M^{+n}$ is a cation of valence n.

As used herein, a chemical group attached to a polymer is considered basic if that chemical group is either a quaternary ammonium group or is a group that is capable of accepting attachment to a labile hydrogen atom. A chemical group that is capable of accepting attachment to a labile hydrogen atom has the characteristic that there exists a range of pH values that overlaps or includes the pH values from 4 to 7 such that, in that range of pH values, when the polymer is in contact with an aqueous medium, 50 mole % or more of the chemical groups have attached a labile hydrogen atom and are cationic. The polymer is said herein to have a basic group as long as the basic group is covalently bonded to the polymer, whether a labile hydrogen atom is attached to the basic group or not.

A collection of particles is characterized by the volume-based distribution of diameters. The parameter DAV is the volume-average diameter of the collection of particles. The parameter D60 denotes the diameter value that has the property that exactly 60% of the collection of the particles, by volume, have diameter less than or equal to D60. The parameter D10 denotes the diameter value that has the property that exactly 10% of the collection of the particles, by volume, have diameter less than or equal to D10. The parameter "uniformity coefficient" (abbreviated "UC") is UC=D60/D10.

As used herein, a compound is "organic" if it contains one or more carbon atom but does not belong to any of the following classes of compounds: binary compounds of carbon, such as carbon oxides, carbon sulfides, carbon disulfide, and similar compounds; ternary compounds such as metallic cyanides, metallic carbonyls, phosgene, carbonyl sulfide, and similar compounds; and metallic carbonates and bicarbonates, such as calcium carbonate, sodium carbonate, sodium bicarbonate, and similar compounds. A compound is "inorganic" if it is not organic.

Ratios are characterized herein as follows. For example, when a ratio is said to be 3:1 or greater, that ratio may be 3:1 or 5:1 or 100:1 but may not be 2:1. To state this in a general way, when a ratio is said herein to be X:1 or greater, it is meant that the ratio is Y:1, where Y is greater than or equal to X. Similarly, for example, when a ratio is said to be 15:1 or less, that ratio may be 15:1 or 10:1 or 0.1:1 but may not be 20:1. To state this in a general way, when a ratio is said herein to be W:1 or less, it is meant that the ratio is Z:1, where Z is less than or equal to W.

The resin composition of the present invention contains resin beads. Resin beads contain polymer in an amount, by weight based on the weight of the resin beads, of 50% or more; preferably 75% or more; more preferably 85% or more; more preferably 95% or more. Preferred polymers contain polymerized units of one or more vinyl monomers. Preferably the polymer contains polymerized units of vinyl monomers in an amount, by weight based on the weight of the polymer, of 50% or more; preferably 75% or more; more preferably 85% or more; more preferably 95% or more. More preferred polymers contain polymerized units of one or more styrenic monomer, or polymerized units of one or more acrylic monomer, or a combination thereof. Preferably the polymerized units of the polymer contain the sum of all styrenic monomers and all acrylic monomers in an amount, by weight based on the weight of the polymer, of 50% or more; preferably 75% or more; more preferably 85% or more; more preferably 95% or more. More preferably, the polymerized units of the polymer contain the sum of all styrenic monomers in an amount, by weight based on the weight of the polymer, of 50% or more; preferably 75% or more; more preferably 85% or more; more preferably 95% or more.

Suitable resin beads contain polymer. Various types of polymers are suitable, including polymers having attached acidic groups, polymers having attached basic groups, polymers having no attached acidic groups and no attached basic groups. Preferred are polymers having attached acidic groups. Preferred acidic groups are carboxylic acid groups and sulfonic acid groups; more preferred are sulfonic acid groups. When acidic groups are present, preferably the mole ratio of acidic groups to polymerized units of monomers is 0.5:1 or greater; more preferably 0.75:1 or greater; more preferably 0.9:1 or greater. When acidic groups are present, preferably the mole ratio of acidic groups to polymerized units of monomers is 2:1 or lower.

Among polymers that have attached acid groups, preferred are polymers having attached carboxylic acid groups in H form, polymers having attached carboxylic acid groups in M form, and polymers having attached sulfonic acid groups in M form, where M is an alkali metal, an alkaline earth metal, or a transition metal. More preferred are polymers having attached sulfonic acid groups in M form. Preferably, M is sodium or calcium; more preferably calcium.

The collection of resin beads has volume average diameter of 150 to 2,000 μm. Preferably, the collection of resin beads has volume average diameter of 1,500 μm or less; more preferably 1,000 μm or less; more preferably 500 μm or less; more preferably 300 μm or less; more preferably 280 μm or less.

The resin beads may be macroreticular resin beads or gel resin beads. Preferred are gel resin beads.

The resin composition of the present invention has pH of 8 or above, more preferably 9 or above.

The resin composition of the present invention contains a collection of inorganic particles. The inorganic particles contain one or more alkaline earths. Preferably the alkaline earth contains one or more of beryllium, magnesium, or calcium; more preferably one or more of magnesium or calcium; more preferably calcium. Preferably, the alkaline earth is in the form of a compound that contains both alkaline earth and oxygen, such as an alkaline earth carbonate, an alkaline earth hydroxide, or a mixture thereof. Preferably, the alkaline earth is in the form of a compound that has solubility in water at pH of 8 or above at 20° C., in grams of compound per 100 grams of water, of 1 g or lower; more preferably 0.5 g or lower; more preferably 0.25 g or lower.

The collection of inorganic particles has volume average diameter of 0.5 μm or larger; preferably 1 μm or larger; more preferably 2 μm or larger; more preferably 5 μm or larger. The collection of inorganic particles has volume average diameter of 50 μm or smaller; more preferably 40 μm or smaller; more preferably 30 μm or smaller.

Preferably the ratio of the number of inorganic particles to resin beads is 0.05:1 or greater; more preferably 0.1:1 or greater; more preferable 0.2:1 or greater. Preferably the ratio of the number of inorganic particles to resin beads is 5:1 or lower; more preferably 2.5:1 or lower; more preferably 1:1 or lower. Preferably, the weight ratio of inorganic particles to resin beads is 0.02:1 or lower; 0.01:1 or lower; more preferably 0.005:1 or lower; more preferably 0.002:1 or lower.

The resin composition of the present invention contains inorganic particles that are separate from the resin beads. That is, the resin composition contains inorganic particles that are located outside of the resin beads.

The resin composition of the present invention may be used for any purpose. A preferred use is the processing of an aqueous composition. A preferred method of processing is to pass the aqueous composition through a container, such as a chromatography column, that contains a resin composition of the present invention. The container is preferably designed and/or configured to allow the aqueous composition to enter the container through an inlet, to make intimate contact with the resin composition, and to exit the container through an outlet, while the container retains the resin composition in the interior of the container. In some cases, after the aqueous composition is introduced into the container, a second aqueous composition, called an "eluent," is then passed through the container via the inlet and the outlet.

In order to pass liquid through the container, the pressure of the liquid must be higher than the pressure of the liquid at the outlet. The quantity "delta-P" is the difference in pressure between the inlet and the outlet, divided by the distance the liquid travels through the resin composition. Delta-P is measured as described below in the Examples.

Preferably, at linear flow rate of 9.1 m/hr, delta-P is 4.4 bar/m or less; more preferably 4 bar/m or less; more preferably 3.5 bar/m or less. Preferably, at linear flow rate of 9.1 m/hr, delta-P is 1 bar/m or more.

Preferably, the resin composition has relatively low packing density. Packing density is measured as described below in the Examples. Preferably, the packing density is 825 $kg/m^3$ or less; more preferably 800 $kg/m^3$ or less.

While the present invention is not limited to any specific mechanism, it is contemplated that the relatively small inorganic particles act as "spacer" particles that prevent tight packing of the resin beads. Because the resin beads do not pack tightly, their packing density is lowered. Also, the looser packing means that there is additional space between the resin beads that allows liquid to flow more easily through a bed of resin beads, thus reducing the delta-P, while still allowing intimate contact between the liquid and the surfaces of the resin beads.

The resin composition may be made by any method. The resin beads may be combined with inorganic particles by any method. One method ("method A") of introducing inorganic particles into the resin composition is preferred when the resin beads contain polymer that has pendant sulfonic acid groups (herein such resin beads are called "SAC" resin beads"). Often, near the end of the process of manufacturing SAC resin beads, the beads are in the H form. It is often desired to convert the SAC to the Ca form. To do that, the SAC is often treated with a mixture of water and calcium-containing inorganic salt. If the calcium-containing inorganic salt contains one or more insoluble compound, such as, for example, calcium hydroxide or calcium carbonate, it is contemplated that particles of the insoluble calcium-containing compound will be left in the resin composition, even after the resin composition has been washed with water. Also envisioned are methods the same as method A except that an alkaline earth other than Ca is used.

The following are examples of the present invention.

Delta-P was measured as follows. Approximately 1 L of resin composition was loaded into a vertical chromatography column (5 cm radius; 45 cm bed depth). The height of the resin bed was recorded. Deionized water was pumped through the column at 50 mL/min for several minutes to settle the resin and drive out air. A preheating column was filled with high fructose corn syrup. A recirculating bath passed heated water at 60° C. through heating jackets on both the preheating column and the chromatography column. High fructose corn syrup was pumped from the preheating column into the chromatography column at 50 mL/min until the Brix concentration of the outlet of the chromatography column equaled the Brix content of the high fructose corn syrup in the preheating column. Then, the outlet of the chromatography column was drained to a reservoir, and the contents of the reservoir was recirculated by a pump to the preheating column. A pressure gauge at the outlet read 0 kPa (0 psig). The pressure reading at the inlet was recorded. The flow rate was changed, and a new pressure reading at the inlet was recorded at each flow rate. The result at each flow rate is recorded as follows:

Delta-P=(pressure reading at inlet)/(height of resin bed)

Packing density was measured by the following method. The "as received" resin in an amount of weight W was placed into a dry, tared graduated cylinder. The resin sample was gently tapped to a constant volume V. The packing density was calculated as follows:

Packing Density (kg/m$^3$)=1000×W (g)/V (ml)

EXAMPLE 1: PACKING DENSITY AND DELTA-P OF FOUR RESINS

Four resin compositions were tested. "Comp 1" and "Comp 2" were comparative resin compositions. "Ex 1" and "Ex 2" were example resin compositions. All four were copolymers of styrene/divinylbenze, gel type, pendant sulfonic acid groups, Ca form, volume average diameter 220 µm.
Comp 1=Diaion™ UBK 555, from Misubishi Chemical Corp
Comp 2=Resin subjected to acid treatment—final pH=5.7
Ex 1=same resin composition as Comp 2, but exposed to insoluble calcium salts and maintained at pH=8.4
Ex 2=different resin composition from Ex 1, also exposed to insoluble calcium salts and maintained at pH=9.9
The four resins and their test results are shown below. The heading "Ca particles?" refers to the presence ("yes") or absence ("no") of calcium-containing inorganic particles.

| Resin Label | Ca particles? | pH | Packing Density | delta-P at 6.1 m/hr | delta-P at 9.1 m/hr |
|---|---|---|---|---|---|
| Comp 1 | no | 4.1 | 853 kg/m$^3$ | 3.0 | 4.8 |
| Comp 2 | no | 5.7 | 841 kg/m$^3$ | 2.9 | 4.5 |
| Ex 1 | yes | 8.4 | 815 kg/m$^3$ | 2.6 | 3.9 |
| Ex 2 | yes | 9.9 | 785 kg/m$^3$ | 2.0 | 3.2 |

EXAMPLE 2: PARTICLE SIZE ANALYSIS OF TWO RESINS

The particle size distributions (that is, frequency of occurrence versus diameter) of Comp 1 and Ex 2 were examined in detail. Comp 1 shows only a single peak at approximately 200 µm, which supports the conclusion that Comp 1 has resin particles but does not have any relatively small inorganic particles. Ex 2 shows two peaks, at approximately 20 µm and at approximately 200 µm, which supports the conclusion that Ex 2 contains both resin beads having volume average diameter of 220 µm and inorganic particles having volume average diameter of approximately 25 µm.

EXAMPLE 3: REMOVAL OF CALCIUM-CONTAINING COMPOUNDS FROM EX 2

Two additional sample resin compositions were prepared:
Comp 3: The resin composition of Ex 2 was treated with an aqueous solution of the sodium salt of ethylenediaminetetraacetic acid, while pH remained above 8. It is considered that all calcium compounds were removed from the resin composition and that the resin was converted to Na form.
Comp 4: The resin composition of Ex 2 was treated with aqueous acid and an aqueous solution of a sodium salt to provide a resin composition in Na form at pH approximately 4. It is considered that the treatment with acid removed all the calcium compounds.
The test results were as follows:

| Resin Composition | Delta-P at 6.1 m/hr |
|---|---|
| Comp 3 | 3.3 bar/m |
| Comp 4 | 3.0 bar/m |

These delta-P values are similar to those of Comp 1 and Comp 2 at the same flow rate and are higher than Ex 1 and Ex 2 at the same flow rate. This result supports the conclusion that removal of the inorganic particles leads to higher delta-P.

The invention claimed is:
1. A resin composition comprising
(a) a collection of resin beads, wherein the collection of resin beads has pH of 8 or above, and wherein the collection of resin beads has volume average diameter of 150 µm to 2,000 µm; and
(b) a collection of inorganic particles, wherein the inorganic particles contain one or more alkaline earths, and wherein the collection of inorganic particles has volume average diameter of 0.5 µm to 50 µm.
2. The resin composition of claim 1, wherein the collection of resin beads has volume average size of 150 µm to 500 µm.
3. The resin composition of claim 1, wherein the collection of resin beads has uniformity coefficient of 1.3 or lower.
4. The resin composition of claim 1, wherein the collection of inorganic particles has volume average diameter of 5 µm to 30 µm.
5. The resin composition of claim 1, wherein the ratio of the number of inorganic particles to the number of resin beads is from 0.1:1 to 2.5:1.
6. The resin composition of claim 1, wherein the packing density of the resin composition is 825 kg/m$^3$ or less.
7. The resin composition of claim 1, wherein the alkaline earth comprises calcium.
8. A method of processing an aqueous composition, wherein the method comprises passing the aqueous composition through an inlet into a container that has an interior, and then passing the aqueous composition out of the container through an outlet, wherein the interior of the container comprises the resin composition of claim 1, wherein the composition of claim 1 is prevented from passing out of the container.

* * * * *